US009697865B2

(12) United States Patent
Dobrowolski et al.

(10) Patent No.: US 9,697,865 B2
(45) Date of Patent: Jul. 4, 2017

(54) METHOD AND SYSTEM FOR PROVIDING UNIVERSAL FOLLOW-ME FUNCTIONALITY

(75) Inventors: Janusz A Dobrowolski, San Diego, CA (US); Oner M Bicakci, Fremont, CA (US)

(73) Assignee: THOMSON LICENSING DTV, Issy les Moulineaux (FR)

( * ) Notice: Subject to any disclaimer, the term of this patent is extended or adjusted under 35 U.S.C. 154(b) by 191 days.

(21) Appl. No.: 14/362,371

(22) PCT Filed: Dec. 13, 2011

(86) PCT No.: PCT/US2011/064523
§ 371 (c)(1),
(2), (4) Date: Jun. 2, 2014

(87) PCT Pub. No.: WO2013/089670
PCT Pub. Date: Jun. 20, 2013

(65) Prior Publication Data
US 2014/0334795 A1    Nov. 13, 2014

(51) Int. Cl.
*H04N 5/765*      (2006.01)
*H04N 9/80*       (2006.01)
(Continued)

(52) U.S. Cl.
CPC .......... *G11B 19/027* (2013.01); *H04L 12/282* (2013.01); *H04N 21/42204* (2013.01); *H04N 21/42684* (2013.01); *H04N 21/4325* (2013.01); *H04N 21/4333* (2013.01); *H04N 21/43615* (2013.01); *H04N 21/6587* (2013.01); *H04N 5/76* (2013.01)

(58) Field of Classification Search
USPC .................................................. 386/234, 248
See application file for complete search history.

(56) References Cited

U.S. PATENT DOCUMENTS 7,375,673 B2    5/2008  Spilo
7,492,877 B2    2/2009  Yamagishi et al.
(Continued)

OTHER PUBLICATIONS

Hopmann et al., "Thanks to geolocalized remote control: the sound will follow," 2008 International Conference on Cyberworlds, IEEE, Sep. 22-24, 2008, pp. 1-6.
(Continued)

*Primary Examiner* — Nigar Chowdhury
(74) *Attorney, Agent, or Firm* — Brian J. Dorini; Patricia A. Verlangieri

(57) ABSTRACT

A method and system includes a plurality of video players and a plurality of remote control devices for implementing follow-me functionalities. Each remote control device has a unique ID and can control all the video players. The method and system receives a first control signal from a first remote control device to interrupt playback of a program by a first video player, interrupts playback of the program at the first video player, and stores the ID of the first remote control device and the status of the playback of the program. The method and system then receives a second control signal from a second remote control device to resume playback of the program at a second video player, checks the stored ID and the ID of the second remote control device, and if the two IDs are identical, resumes playback of the program at the second video player according to the status.

2 Claims, 8 Drawing Sheets

(51) Int. Cl.
  *G11B 19/02*    (2006.01)
  *H04N 21/422*   (2011.01)
  *H04N 21/426*   (2011.01)
  *H04N 21/432*   (2011.01)
  *H04N 21/433*   (2011.01)
  *H04N 21/436*   (2011.01)
  *H04N 21/6587*  (2011.01)
  *H04L 12/28*    (2006.01)
  *H04N 5/76*     (2006.01)

(56) References Cited

U.S. PATENT DOCUMENTS

| | | | |
|---|---|---|---|
| 7,737,862 B2* | 6/2010 | Watanabe | G08C 17/02 |
| | | | 340/10.5 |
| 2005/0195848 A1* | 9/2005 | Braneci | H04L 12/40091 |
| | | | 370/421 |
| 2006/0197834 A1 | 9/2006 | Balanica | |
| 2008/0060028 A1 | 3/2008 | Chiang | |
| 2009/0216351 A1* | 8/2009 | Van Horck | H04L 29/06027 |
| | | | 700/94 |
| 2009/0232481 A1* | 9/2009 | Baalbergen | H04N 7/163 |
| | | | 386/328 |
| 2010/0053466 A1 | 3/2010 | Naka et al. | |

OTHER PUBLICATIONS

Search Report Dated Sep. 6, 2012.

\* cited by examiner

US 9,697,865 B2

METHOD AND SYSTEM FOR PROVIDING UNIVERSAL FOLLOW-ME FUNCTIONALITY

This application claims the benefit, under 35 U.S.C. §365 of International Application PCT/US2011/064523, filed Dec. 13, 2011, which was published in accordance with PCT Article 21(2) on Jun. 20, 2013 in English.

BACKGROUND OF THE INVENTION

Field of the Invention

The present invention relates to a method and system for providing universal follow-me functionality in a residential or non-residential setting.

Background Information

Many types of electronic and personal computing equipment currently available to the consumer can be networked together in a home or office environment, such a hotel or TV studio, using protocols such as Universal Plug and Play (UPnP) and Multimedia over Coax Alliance (MoCA). Such environment offers great opportunities to share media content in different rooms. One feature that has been disclosed to enhance the sharing is the universal follow-me feature, which allows a user to pause or stop the playing of content at one location and resume the playback at a different location. However, the conventional universal follow-me functionalities are cumbersome to a user. For example, they require a user to invoke a menu and select a program that the user desired to resume. Accordingly, it would therefore be desirable to have a system and method that offer a more user friendly universal follow-me feature.

SUMMARY OF THE INVENTION

In accordance with an aspect of the present invention, a method for use in a system comprising a plurality of video players is disclosed, the method comprising steps of receiving a first control signal from a first remote control device to interrupt playback of a program by a first one of the video players, the first control signal comprising an identification of the first remote control device; interrupting playback of the program by the first one of the video players; storing in a memory the identification of the first remote control device and status of the playback of the program; receiving a second control signal from a second remote control device to resume playback of the program by a second one of the video players; and if an identification of the second remote control device in the second control signal is identical to the identification of the first control signal stored in the memory, enabling playback of the program by the second one of the video players.

In another embodiment, the method further comprises a step of turning off the first one of the video player.

In another embodiment, the playback enabling step comprises a step of turning on the second one of the video players.

In another embodiment, the interrupting step comprises a step of enabling the first one of the video players to provide an indicator indicating that the program is to be resumed at one of the video players.

In another embodiment, the playback enabling step comprises a step of removing the identification of the first remote control device and the status of the playback of the program.

In an embodiment, the first control signal is received by the first one and a third one of the video players and the method further comprises steps of measuring signal strength of the first control signal by the first one and the third one of the video players; and selecting the first one of the video players if the measured signal strength by the first one of the video players is greater than the measured signal strength by the third one of said video players.

In another embodiment, the program is a recorded program, the status indicates a position in the recorded program when playback by the first one of the video players was interrupted, and the playing back enabling step enables the second one of the video players to play back the recorded program from position.

In another embodiment, the program is a broadcast program from a channel, the status represents an identification of the channel, and the playing back enabling step enables the second one of said video players to tune to the channel for displaying a broadcast program from the channel according to the identification of the channel.

In accordance with another aspect of the present invention, a method for use in a video server serving a plurality of video receivers is disclosed, the method comprising steps of receiving a first signal from a first one of the video players, the first signal representing a first control signal from a first remote control device to interrupt playback of a program being played back by the first one of the video devices, the first signal comprising an identification of the first remote control device; stopping sending content of the program to the first one of the video players; storing in a memory the identification of the first remote control device; storing status of the playback of the program and linking the status with the stored identification; receiving a second signal representing a second control signal to resume playback of the program by a second one of the video players, the second signal comprising an identification of a second remote control device; and if the identification of the second remote control device in the second signal is identical to the stored identification in the memory, resuming sending content of the program to the second one of the video players according to the status.

In another embodiment, the method for use in a video server further comprises before the identification storing step, a step of determining if the identification of the first remote control device in the first signal is already stored in the memory; and if the identification of the first remote control device is already in the memory, informing the first one of the video players not to interrupt the program and skipping the stopping step and the two storing steps.

In another embodiment, the method for use in a video server further comprises a step of instructing said first one of said video players to provide an indicator indicating that said program is to be resumed at one of said video players.

In another embodiment, the method for use in a video server further comprises a step of if the identification of the second remote control device in the second signal is different from the stored identification in the first signal in the memory, instructing the second one of the video players to not to resume a playback of a program.

In another embodiment, the method for use in a video server further comprises a step of if the second one of the video players is incapable of resuming the playback of the program, instructing the second one of the video players to provide an indicator indicating that playback cannot be resumed by the second one of the video players.

In another embodiment, the method for use in a video server further comprises a step of a step of receiving signal strength indicators of the first control signal respectively from the first one and a third one of the video players and if the signal strength indicated by the signal strength indicator from the first one is greater, selecting the first one of the video players to interrupt playback of the program.

In another embodiment, the method for use in a video server, wherein the program is a recorded program, the status indicates a position in the recorded program when playback by the first one of the video players was interrupted, and enables the second one of the video players to resume playing back the recorded program from the position.

In another embodiment, the method for use in a video server, wherein the program is a broadcast program from a channel, the status represents an identification of the channel, and the second one of the video players resumes playback of the program by tuning to the channel for receiving a broadcast program from the channel according to the identification of the channel.

In accordance with another aspect of the present invention, a method for use in a first video player is disclosed, the method comprising steps of receiving a first control signal to interrupt playback of a program by the first video player, the first control signal comprising an identification of a first remote control device; sending a first signal to the video server, the first signal comprising the identification of the first remote control device and a request to interrupt playback of the program; receiving from a response from the video server; if the response indicates to interrupt the program, stopping playing back the program; and if the response indicates not to interrupt said program, continuing to receive the first control signal.

In accordance with another aspect of the present invention, a method for use in a second video player is disclosed, the method comprising steps of receiving a second control signal from a second remote control device to resume playback of a program previously interrupted by a first control signal transmitted by the second remote control device, the second control signal comprising an identification of a second remote control device; sending a second signal to the video server, the second signal comprising the identification of the second remote control device and a request to resume playback of the program; receiving from the video server a response; if the response indicates to resume playback, resuming the playback of the program by receiving program signals from the video server; and if the response indicates not to resume playback, performing a different function assigned to the second control signal (810, 801).

In accordance with another aspect of the present invention, a system is disclosed. The system comprises a first video player and a second video player different from said first video player; a video server; and a first remote control device ($30_1$-$30_4$) and a second remote control device; wherein the first and second remote control devices each comprise a follow-me key and a resume key; the first remote control device sends the first video player a first control signal comprising an identification of the first remote control device when the follow-me key in the first remote control device is activated; the first video player receives the first control signal while playing back a program and sends the video server a first signal including the identification of the first remote control device and a request to stop receiving content of the program; the second remote control device sends the second video player a second control signal including identification of the second remote control device when the resume key in the second remote control device is activated; the second video player send a second signal including the identification of the second remote control device and a request to resume playback of the program; and if the identification of the first remote control device and the identification of the second remote control device are identical, the video server sends content of the program to the second video player.

In accordance with another aspect of the present invention, a video server is disclosed. The video server comprises a processor; and a memory; wherein in response to a first signal from a first video player comprising an identification of a first remote control device and a request to stop sending content of a program, the processor stores in the memory the identification of the first remote control device, stops sending content of the program, and stores status of playback of the program; in response to a second signal from a second video player different from the first video player comprising an identification of a second remote control device and a request to resume sending content of the program, the processor resumes sending of content of the program to the second video player if the stored identification of the first remote control device is identical to the identification in the second signal.

In accordance with another aspect of the present invention, a first video player is disclosed. The first video player comprises a processor; and a memory; wherein the processor receives content of a program from a server, buffered in the memory for playing back; receives a first control signal to interrupt playback of the program, the first control signal comprising an identification of a first control device; sends a first signal to a video server, the first signal comprising the identification of the first remote control device and a request to interrupt playback of the program; receives from a response from the video server; if the response indicates to interrupt the program, stops playing back the program; and if the response indicates not to interrupt the program, continues to receive the first control signal.

In accordance with another aspect of the present invention, a second video player is disclosed. The second video player comprises a processor; and a memory; wherein the processor receives a second control signal from a second remote control device to resume playback of a program previously interrupted by a first control signal transmitted by the second remote control device, the second control signal comprising an identification of a second remote control device; sends a second signal to the video server, the second signal comprising the identification of the second remote control device and a request to resume playback of the program; receives from the video server a response; if said response indicates to resume playback, receives content of the program from the video server, retrieves the received content buffered in the memory, and resumes the playback of the program in the memory; and if the response indicates not to resume playback, performs a different function assigned to the second control signal.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
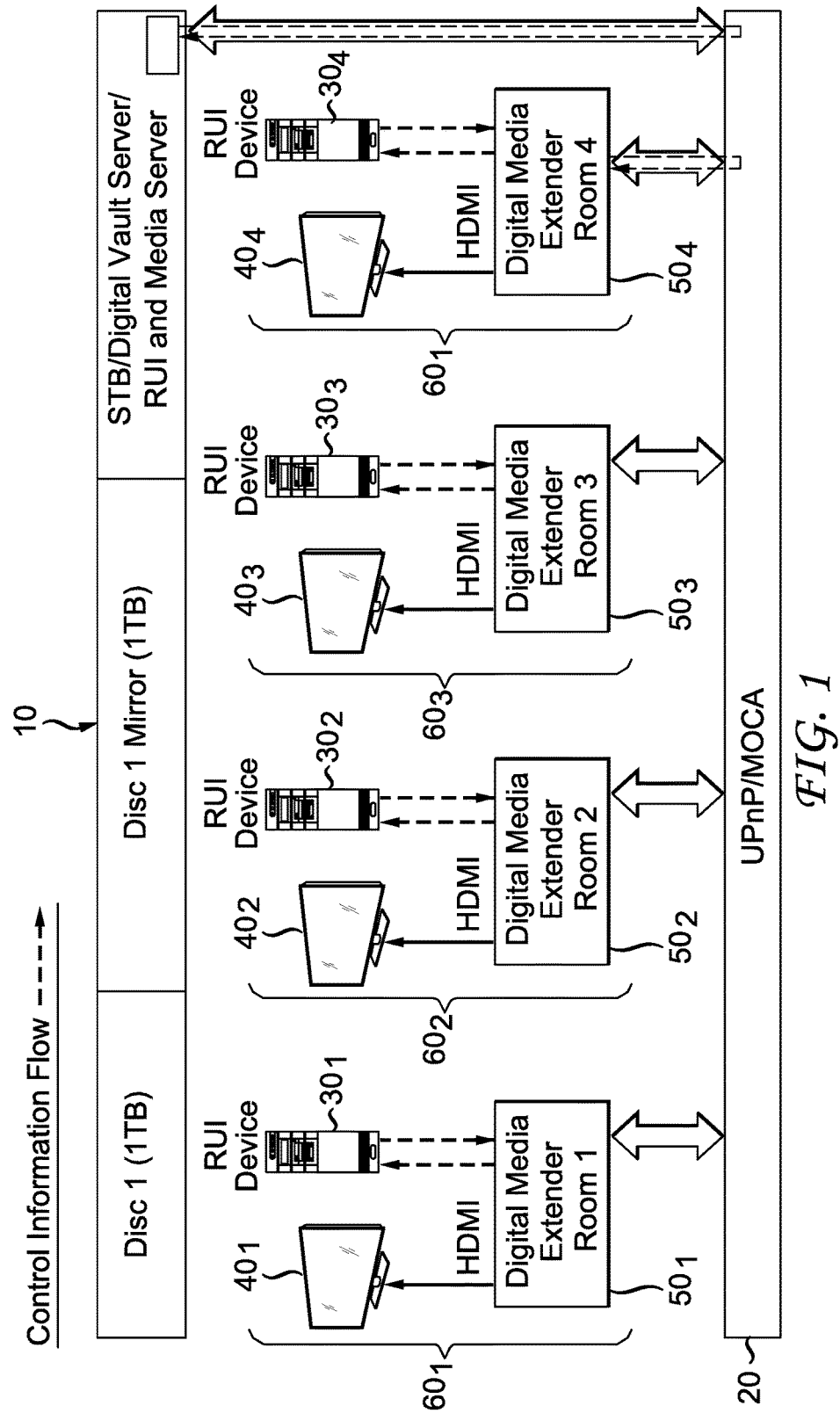
FIG. 1 shows a system comprising a plurality of video players according to an exemplary embodiment of the present invention.

Referring now to the drawings, and more particularly to FIG. 1, an exemplary system 1 suitable for implementing the present invention is shown. As indicated in FIG. 1, environment 1 comprises a video server 10, coaxial cable network 20, four video players $60_1$-$60_4$, each of which includes a corresponding one of digital media expender $50_1$-$50_4$ and a corresponding one of display $40_1$-$40_4$, and four remote user interfaces (RUIs) or remote control devices $30_1$-$30_4$. The video server 10 and the four video players $60_1$-$60_4$ are networked together through the coaxial cable network 20. They can communicate with one another using protocols such as Universal Plug and Play (UPnP) and Multimedia over Coax Alliance (MoCA). Although illustrated as a coaxial cable network, other conventional wired media can be used as well. Furthermore, the elements can be networked wirelessly as well.

The video server 10, as shown, includes a disc 1 of a desired capacity say terabytes and a mirror disc 1 of a terabyte for storing recorded programs. More discs or storage devices may be added as well. The video server 10 may be a set-top box (SB), a digital vault server, a media server, a digital video recorder (DVR), or a personal video recorder (PVR), etc. In addition to reproducing a recorded program in the disc 1, the video server 10 may be operative to receive signals including audio, video and/or data signals having one or more types of analog modulation (e.g., NTSC, PAL, SECAM, etc.) and one or more types of digital modulation (e.g., QPSK, QAM, VSB, etc.) from one or more signal sources such as cable, terrestrial, satellite, internet and/or other signal sources and transmit these received signals to one or more of the video players 60. That is the server is capable of producing one or more video sessions from signals from the I/O 303 and delivering a session to multiple video players 60. A video session may not only consist of a single cable video channel or a program recorded by a DVR, but also a video having picture-in-picture showing, for example, a preview of another channel, a signal from the web, text from a Short Message Service (SMS), or an email. The video server 10 is operative to allow instant, time-shift and timer recordings in response to messages received from one or more of the video players 60. Time-shift recording is a system that is used temporarily to store broadcast signals for later viewing, instant recording is a system for immediate recording and timer recording is a system that is used for predefined, later recording of media content. The video server 10 may include more than one tuner to receive programs from more than one channel simultaneously.

The video server 10 is operative to receive signals from other devices and operative to implement universal follow-me functionalities as described later according to the principles of the invention. According to an exemplary embodiment, the video server 10 receives a request from a first one of the video players 60 to interrupt a playback of s program by a first one of the video players 60 as requested by the first one of the RUIs 30. The server 10 stops sending content of the program, and records an identification of the first one of the RUIs 30 and the status of the playback of the program by the first one of the video players 60. When the video server 10 receives from a second one of the video players 60 to resume the playback of a program from the first one of the RUIs 30, the video server 10 resumes sending of the content of the interrupted program to the second one of the video players 60 for resumption of the playback of the interrupted program at the second one of the video players 60.

The server 10 may include a table of registered users identified by the identifications of respective RUIs 30. The server 10 may include a table restricting a signal source to a particular set of RUIs 30 and/or restricting a signal source to a particular set of video players due to, for example, copyrights. The association between a RUI and a user may be set during the set-up of the server 10 or dynamically by, for example, a fingerprint sensor equipped in a RUI. When a user places his/her finger(s) in the fingerprint sensor of an RUI, the RUI, upon detection of the fingerprint, sends the fingerprint and its ID to the server 10, and the server 10 then records the RUI as belonging to the user having the detected fingerprint.

Although each of the video players 60 is shown as including two separate components, a corresponding one of the digital media expenders 50 and a corresponding one of the displays 40, in which the output of the corresponding one of the digital media expenders 50 is connected to an HDMI port of the corresponding one of the displays 40, the two elements can be integrated into one. Furthermore, each of the video players 60 can be interpreted to include only the corresponding one of the digital media expanders 50 without including the corresponding one of the displays 40. Each one of the video players 60 may also include a tuner for receiving a broadcast signal for the off-line (non-network based) display operating mode.

Each of the RUIs 30 includes a plurality of input keys and outputs control signals in a wireless (e.g., via infrared or radio frequency (RF) link, etc.) manner responsive to user depression of its input keys. Each of the RUIs 30 may for example be embodied as a hand-held remote control device, a wireless keyboard, a cell phone, a tablet, and/or other user input device. The input keys generally includes an OK key to confirm a selection, a STOP key to stop playback of a program, a PAUSE key to pause playback of a program, number keys, arrow keys, a volume key, and other keys necessary to operate the video players 60. In this embodiment, each of the RUIs 30 also include a follow-me key, which when pressed indicates that the program being playback will be interrupted and will be resumed by the same or a different one of the video players 60. In effect, the activation of the follow-me key initiates a follow-me session. In another embodiment, either STOP or PAUSE key can be used as the follow-me key. The OK key is normally used for confirming a selection, for example, of a menu item. However, in this embodiment, the OK key is also used to resume playback in a follow-me session and can be called a resume key. In another embodiment, the resume key can be a separate key from the OK key. It should be noted that each of the four RUIs $30_1$-$30_4$ can control any of the four video players $60_1$-$60_4$. However, each should have a different identification (ID) and a control signal sent by an RUI should include the ID of the sending RUI. If two RUIs have the same ID, the system will treat them as the same RUI. Each one of the RUIs 30 may be equipped with IR or RF or both transmitters and may be equipped with a signal receiver to receive a signal from the video players 60.

In another embodiment, each of the RUIs 30 may be equipped with Wi-Fi capability, so that it can communicate with each of the video players 60 and the video server 10 through a wireless router (not shown), which is connected to the coaxial cable network 20 by a network adapter (not shown) connecting the router to the coaxial cable network 20. For example, Actiontec®, 760 N. Mary Avenue, Sunnyvale, Calif., USA produces Ethernet to coax MoCA network adapters for cable TV household. In this case, the ID of a RUI can be a network address. If Bluetooth is used, the ID of a RUI can be a Bluetooth ID.

Although, in the embodiment, MoCA or UPnP, is used as the communication protocol, other communication protocols can be used as well.

In this embodiment, each one of the video players 60 is located in a different room and a control signal sent by an RUI in a room should not be able to reach the video players in other rooms. In another embodiment, a remote control signal, such as an RF remote control signal, may be received by two or more of the video players 60.

To better understand the principles of the invention, let us assume that in the environment shown in FIG. 1, user A uses the RUI $30_4$ in Room 4 to command the video player $60_4$ to play back program A, the video player $60_4$ will request the video server 10 to transmit the content of program A to the video player $60_4$. Program A can be a recorded program stored in the disc 1 or a broadcast program received by the video server 10 from a broadcast channel.

To continue the example above, assume that user A then presses the follow-me button on the RUI $30_4$, the playback of program A by the video player $60_4$ is interrupted, i.e., paused or stopped. The control information flow of the system 1 with respect to Room 4 is shown in FIG. 1. User A then brings the RUI $30_4$ and goes to Room 1, where user B is watching program B, which has been playing back by the video player $60_4$. User A feels that program A is more interesting and wants to show user B program A. As such, user A presses the OK key in RUI $30_4$ and in response to the OK control signal, the video player $60_1$ resumes playback of program A substantially from the point where program A was interrupted at the video player $60_4$. The control information flow of the system 1 would be similar to that of the operation in Room 4. In another embodiment, each of the RUIs 30 may designate another key other than the OK key, which when pressed allows the resumption of the playback of a program to start from the position where program A was interrupted by the video player $60_4$. In yet another embodiment, each of the RUIs 30 may also designate another key other then the OK key, which when pressed allows the resumption of the playback of a program to start from the beginning of a recorded program.

Figure 2:
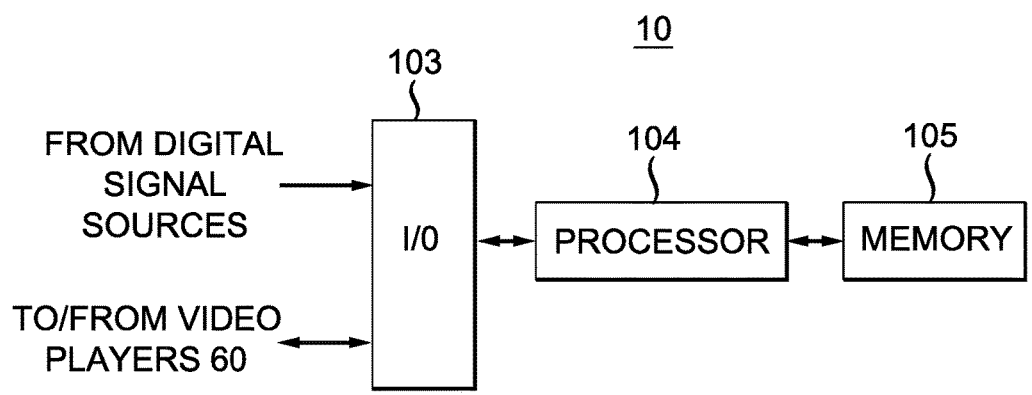
FIG. 2 shows a block diagram of the video server shown in the system of FIG. 1 according to an exemplary embodiment of the present invention.

FIG. 2 shows further details of the video server 10 of FIG. 1 according to an exemplary embodiment of the present invention. The video server 10 of FIG. 2 comprises input/output (I/O) means such as I/O block 103, processing means such as processor 104, and memory means such as memory 105. Some of the foregoing elements of FIG. 2 may be embodied using integrated circuits (ICs), and some elements may for example be included on one or more ICs. For clarity of description, certain conventional elements associated with the video server 10 such as certain control signals, power signals and/or other elements may not be shown in FIG. 2.

I/O block 103 is operative to perform I/O functions of the video server 10. According to an exemplary embodiment, I/O block 103 comprises a cable network interface and is operative to output processed (e.g., MPEG decoded) or unprocessed signals (e.g., without MPEG decoded) and control signals to one or more of the video players 60 and receives control signals and optionally audio/video signals from one of more of the video players 60. If the video server 10 also includes one or more tuners to receive broadcast signals, the video server 10 is also operative to receive signals such as audio, video and/or data signals in analog and digital modulation formats from one or more signal sources such as cable, terrestrial, satellite, internet and/or other signal sources. Although not expressly shown in FIG. 2, I/O block 103 may include a plurality of input terminals each designated to receive signals from a given signal source. For example, I/O block 103 may include separate input terminals for receiving signals from cable, antenna (i.e., terrestrial), satellite, internet and/or other signal sources.

The processor 104 is operative to perform various processing and control functions of the video server 10. According to an exemplary embodiment, the processor 104 transmits recorded audio/video signals stored in the memory 105 or broadcast signals from the I/O block 103 to one or more of the video players 60 through the cable network 20 using for example the MoCA or UPnP protocol. The transmitted signals may be compressed, for example, MPEG encoded, or uncompressed, for example MPEG decoded. The video server processes the audio, video and/or data signals provided from I/O block 103 by performing functions including channel tuning, analog and digital demodulation, and other functions to thereby generate data representing audio, video and/or data content. The data produced from such processing functions may be provided for further processing (e.g., MPEG decoding, etc.) and output. Also according to an exemplary embodiment, processor 104 detects and processes inputs (including control signals) from the video players 60, and may control its own operations and/or output control signals to control other elements of the video server 10 (including elements not shown in FIG. 2) responsive to such inputs.

Processor 104 is also operative to execute software code to receive a request from a first one of the video players 60 to interrupt a playback of a program by the first one of the video players 60 as requested by one of the RUIs 30, stop sending content of the program, and records an identification of the one of the RUIs 30 and the status of the playback of the program according to the principles of the present invention. The processor 104 is also operative to execute software code to receive from a second one of the video players 60 to resume the playback of the interrupted program from the same one of the RUIs 30 and resume sending the content of the interrupted program to the second one of the video players 60 for resumption of the playback of the interrupted program according to the principles of the present invention. The second one of the video players 60 may be the same one as or a different one from the first one of the video players 60.

The processor 104 is also operative to perform and/or enable other functions of the video server 10 including, but not limited to, detecting inputs to the video server 10, reading and writing data from and to memory 25, and/or other functions.

The memory 105 is operative to perform data storage functions of the video server 10. According to an exemplary embodiment, the memory 105 stores data including, but not limited to, software code, MOCA protocol stack, UPnP protocol stack, electronic program guide data, data necessary to resume an interrupted program, recorded programs, a portion of a currently received broadcast programs, and/or other data. The memory 105 may include the volatile and/or non-volatile memory regions and storage devices such hard disk drives (e.g., the disc 1 and the mirror disc 1 shown in FIG. 1), and DVD drives. The memory 105 also contains Disc memory for the recorded content.

Figure 3:
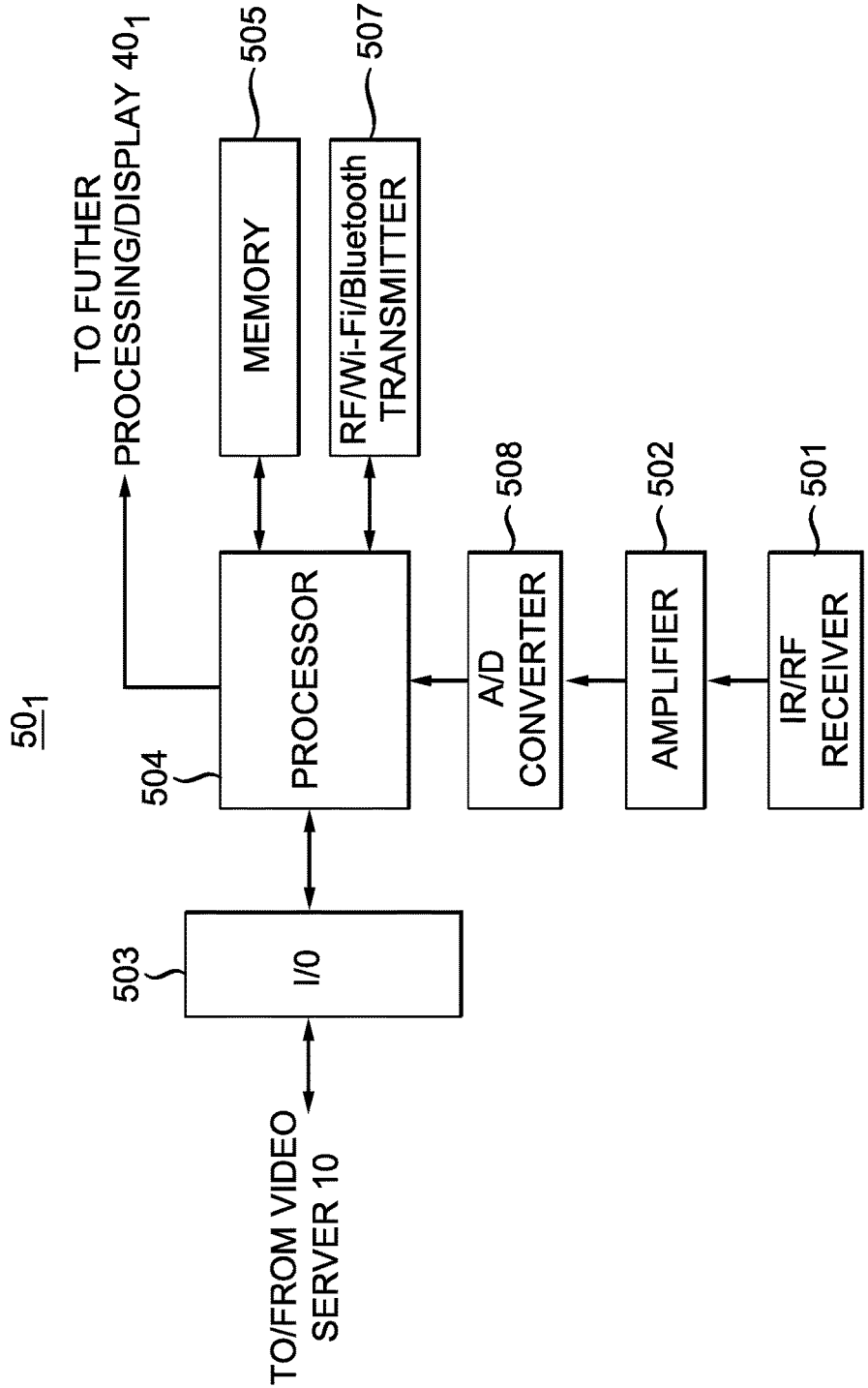
FIG. 3 shows a block diagram of the video players shown in the system of FIG. 1 according to an exemplary embodiment of the present invention.

FIG. 3 shows further details of the digital media extenders 50 of FIG. 1 according to an exemplary embodiment of the present invention. The digital media extender $50_i$ of FIG. 3 comprises IR/RF receiver 501, amplifying means such as amplifier 502, analog to digital (A/D) converter 508, input/output (I/O) means such as I/O block 503, processing means such as processor 504, memory means such as memory 505, and RF/Wi-Fi/Bluetooth transmitter 507. Some of the foregoing elements of FIG. 3 may be embodied using integrated circuits (ICs), and some elements may for example be included on one or more ICs. For clarity of description, certain conventional elements associated with the digital media extender $50_i$ such as certain control signals, power signals and/or other elements may not be shown in FIG. 3.

The IR/RF receiver 501 is operative to receive user inputs from RUIs 30, and to output signals corresponding to the user inputs to amplifier 502. According to an exemplary embodiment, the IR/RF receiver 501 receives signals from user input devices, such as the RUIs 30 and generates corresponding signals which are output to amplifier 502. The amplifier 502 is operative to amplify the signals provided from the IR/RF receiver 501 for output to the A/D converter 508, which outputs the digital signals to the processor 504. Although shown as an IR/RF receiver 501, the receiver 501 may include only one of the IR receiver and RF receiver, or both.

I/O block 503 is operative to perform I/O functions of the digital media extender $50_i$. According to an exemplary embodiment, I/O block 503 comprises a cable network interface and is operative to receive processed (e.g., MPEG decoded) or unprocessed signals (e.g., without MPEG decoded) and control signals from the video server 10, and sends control signals and optionally audio/video signals to the video server 10.

The processor 504 is operative to perform various signal processing and control functions of the digital media extender $50_i$. According to an exemplary embodiment, the processor 504 receives recorded audio/video signals or broadcast signals from the I/O block 503 from the video server 10 through the cable network 20 using for example the MoCA or UPnP protocol. The received signals may be processed (e.g., MPEG decoded, etc.) and output to a displayer $40_i$ through, for example, an HDMI interface. The output video may also be in one of the composite, S-Video, and composite video formats.

The processor 504 is also operative to execute software code that processes a follow-me control signal received from an RUI, retrieves an identification of the RUI in the follow-me control signal, and forms a first signal comprising the retrieved identification and a request to the video server 10 to stop sending content of a program to the video player $60_i$, and sends the first signal and the request to the video server 10 through the cable network 20. When the request is granted by the server 10, the processor 504 interrupts the playback of the program. The first signal may include one signal that includes both the RUI identification and the request, or two signals, one for the RUI identification and the other for the request.

The processor 504 is also operative to execute software code that processes a resume control signal, such as the OK key, to resume playback of a program previously interrupted by a follow-me control signal, retrieves identification of the RUI in the resume control signal, and forms a second signal comprising the retrieved identification and a request to the video server 10 to resume sending content of a program to the video player $60_i$, and sends the second signal and the request to the video server 10 through the cable network 20. When the request is granted, the processor 504 resumes the playback of the program. The second signal may include one signal that includes both the RUI identification and the request, or two signals, one for the RUI identification and the other for the request.

The processor 504 may be operative to form RF signals for controlling, for example, a display and LEDs, of the RUIs 30. For example, an RF signal may be sent by the processor 504 to instruct one of the RUIs 30 to turn on some of the LEDs after the processor 504 has processed a follow-me control signal sent by that RUI.

The memory 505 is operative to perform data storage functions of the digital media extender $50_i$. According to an exemplary embodiment, the memory 505 stores data including, but not limited to, software code, MoCA software stack, UPnP software stack, MPEG decoder, and/or other data. The memory 505 may include volatile and/or non-volatile memory regions and storage devices such hard disk drives, DVD drives. The memory 505 also provides a buffer for buffering content of a program received from the video server 10 and the associated video player plays back the program by reading content of the program from the buffer.

The RF/Wi-Fi/Bluetooth transmitter 507 is operative to transmit RF control signals to the RUIs 30 for controlling, for example, the display and LEDs, of RUIs 30.

Figure 4:
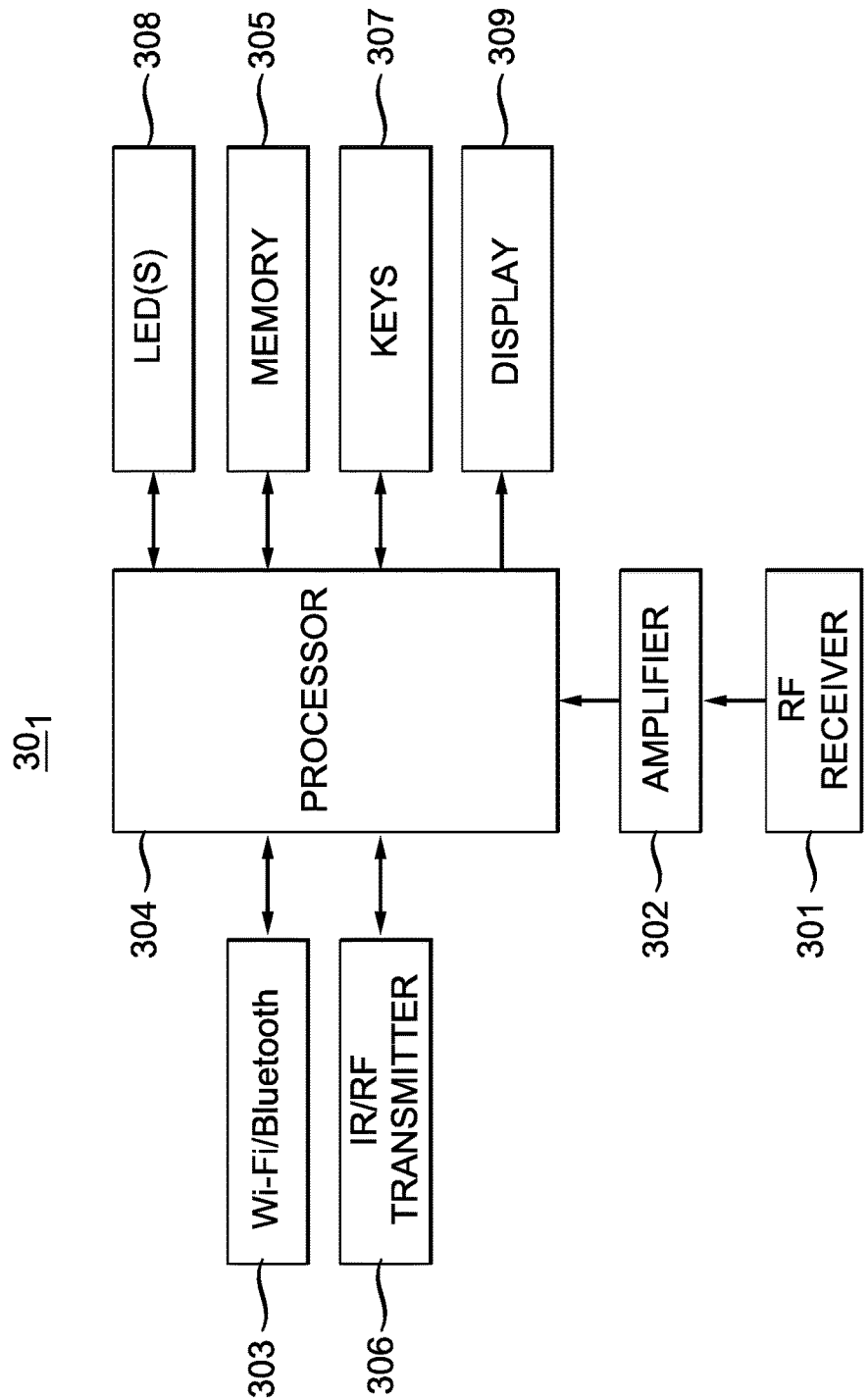
FIG. 4 shows a block diagram of the remote control devices shown in the system of FIG. 1 according to an exemplary embodiment of the present invention.

FIG. 4 shows further details of the RUIs 30 of FIG. 1 according to an exemplary embodiment of the present invention. The RUI $30_i$ of FIG. 4 comprises an RF receiver 301, an IR/RF transmitter 306, amplifying means such as amplifier 302, Wi-Fi/Bluetooth interface 303, processing means such as processor 304, memory means such as memory 305, a keyboard 307, one or more of the LEDs 308 and/or a display 309, such as an LCD. Depending on the features to be supported, not all the elements above are required. For example, the Wi-Fi/Bluetooth interface 303 is not required if UPnP or MoCA adaptor (not shown) is present in the system to enable communication between the RUIs 30, and the video server 10 and the video players 60 using IP messages. The RF receiver 301 is not required if the RUI does not receive control signals from one of the video players 60. Some of the foregoing elements of FIG. 3 may be embodied using integrated circuits (ICs), and some elements may for example be included on one or more ICs. For clarity of description, certain conventional elements associated with the digital media extender $50_I$ such as certain control signals, power signals and/or other elements may not be shown in FIG. 4.

The RF receiver 301 if equipped is operative to receive RF control signals from the video players 60, and to output signals corresponding to the received control signals to the amplifier 302. The amplifier 302 is operative to amplify the signals provided from the RF receiver 301 for output to processor 304.

The keyboard 307 includes keys such as the follow-me key, the OK key, and other keys. When a key is pressed, the processor 304 receives the key press signal, interprets the key press signal, and performs corresponding functions as necessary.

The Wi-Fi/Bluetooth interface 303, if equipped, is operative to transmit IP messages to the video players 60 and receive IP messages from the video players 60. The Wi-Fi/Bluetooth interface 303 may include at least one of the Wi-Fi and Bluetooth interfaces.

The processor 304 is operative to perform various signal processing and control functions of the RUI $30_i$. According to an exemplary embodiment, the processor 304 processes input signals from the keyboard 307 and performs corresponding functions accordingly. For example, when the processor 304 detects that the follow-me key has been pressed, the processor 304 retrieves from the memory 305 an identification of the RUI $30_i$, generates a first control signal including the retrieved identification and a follow-me signal representing a request to interrupt the current playback of a program by the first one of the video players 60, and sends the first control signal to a first one of the video servers 60 via the IR/RF transmitter 306. Either the IR or RF transmission portion or both portions can be utilized depending on whether the video players 60 are equipped with either just IR or RF receiver or both. If the Wi-Fi/Bluetooth interface 303 is equipped, the processor 304 may form an IP message from the first control message and send the IP message via the Wi-Fi/Bluetooth interface 303 to a particular one of the video players 60. In response, the particular one of the video players 60 may send a control signal back to the RUI $30_i$, asking the RUI $30_i$ to turn on one or more of the LEDs 308 to indicate that a follow-me session is on or to illuminate the display 309 and/or display a message, if equipped. The display 309 may display some content like a preview of another channel. The control signals may be received by the RF receiver 301 or the Wi-Fi/Bluetooth 303 interface.

For a second example, when the processor 304 receives an OK signal from the keyboard 307, the processor 304 retrieves from the memory 305 the identification of the RUI $30_i$, and generates a second control signal including the retrieved identification. If the RUI $30_i$ remembers that it has initiated a follow-me session, the second control signal may include data representing a request to resume playback of a program previously interrupted by the RUI $30_i$. If a key other than the OK key is dedicated as the resume key, the data is not needed because the second control signal itself represents a request to resume a playback. The RUI $30_i$ then sends the second control signal to a second one of the video servers 60 via the IR/RF transmitter 306. Either the IR or RF transmission portion or both portions can be utilized depending on whether the video players 60 are equipped with either just IR or RF receiver or both. If the Wi-Fi/Bluetooth interface 303 is equipped, the processor 304 may form an IP message from the second control message and send the IP message via the Wi-Fi/Bluetooth interface 303 to the second one of the video players 60. In response, the second one of the video player 60 may send a control signal back to the RUI $30_i$, asking the RUI $30_i$ to turn off one of more of the LEDs 308 to indicate that a follow-me session is off. The control signal from the second one of the video players 60 may be received by the RF receiver 301 or the Wi-Fi 303 interface.

The processor 304 is also operative to perform and/or enable other functions of the RUI $30_i$, including, but not limited to, detecting inputs to the RUI $30_i$, reading and writing data from and to memory 305, and/or other functions.

The memory 305 is operative to perform data storage functions of the RUI $30_i$. According to an exemplary embodiment, memory 305 stores data including, but not limited to, software code, the identification of the RUI $30_i$, the IP addresses of the video server 10 and the video players 60, and/or other data. The memory 305 may include volatile and/or non-volatile memory regions and storage devices such hard disk drives.

Figure 5:
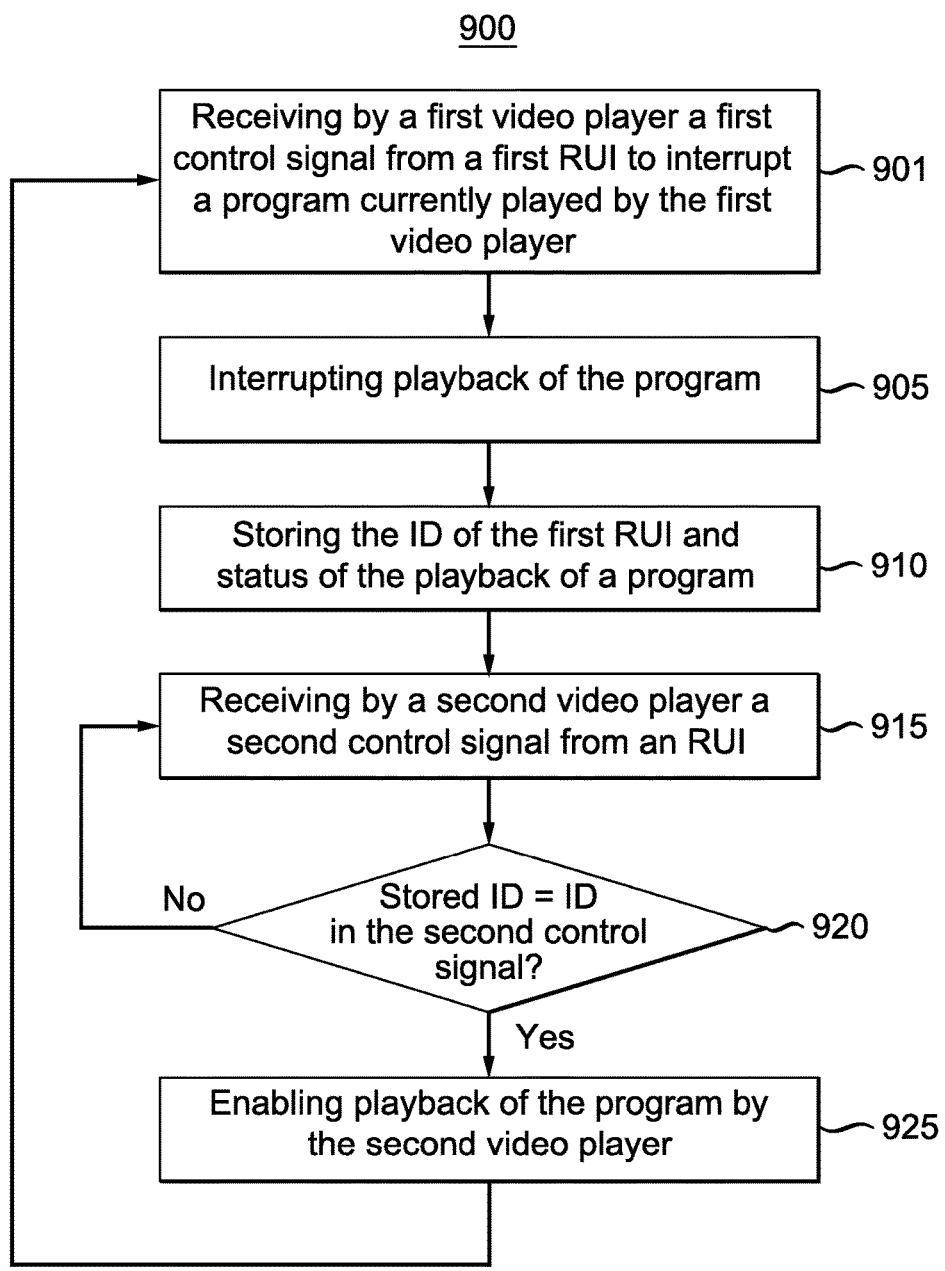
FIG. 5 shows the process flow of the system of FIG. 1 according to an exemplary embodiment of the present invention.
Figure 6:
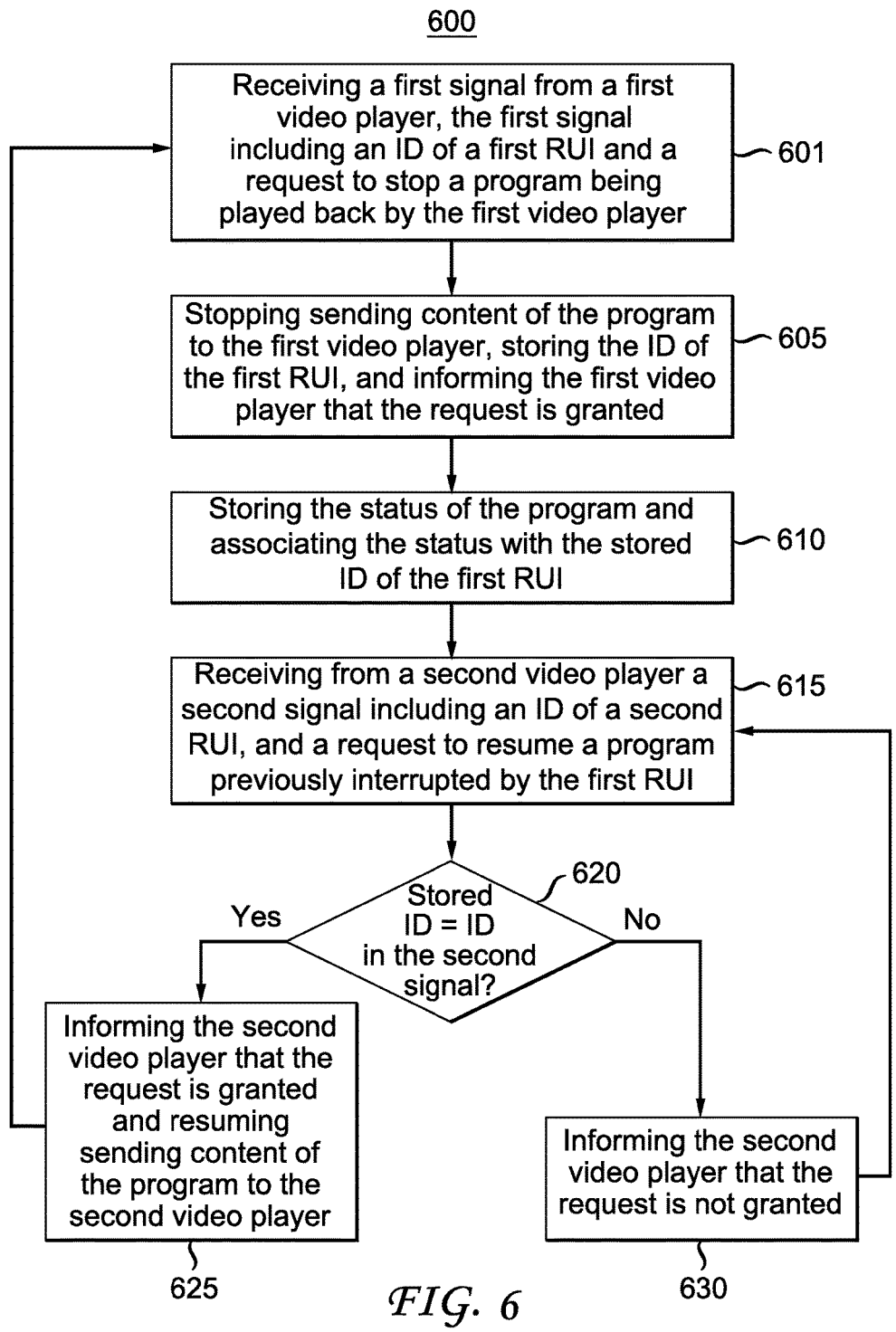
FIG. 6 shows the process flow of the video server in the system of FIG. 1 according to an exemplary embodiment of the present invention.
Figure 7:
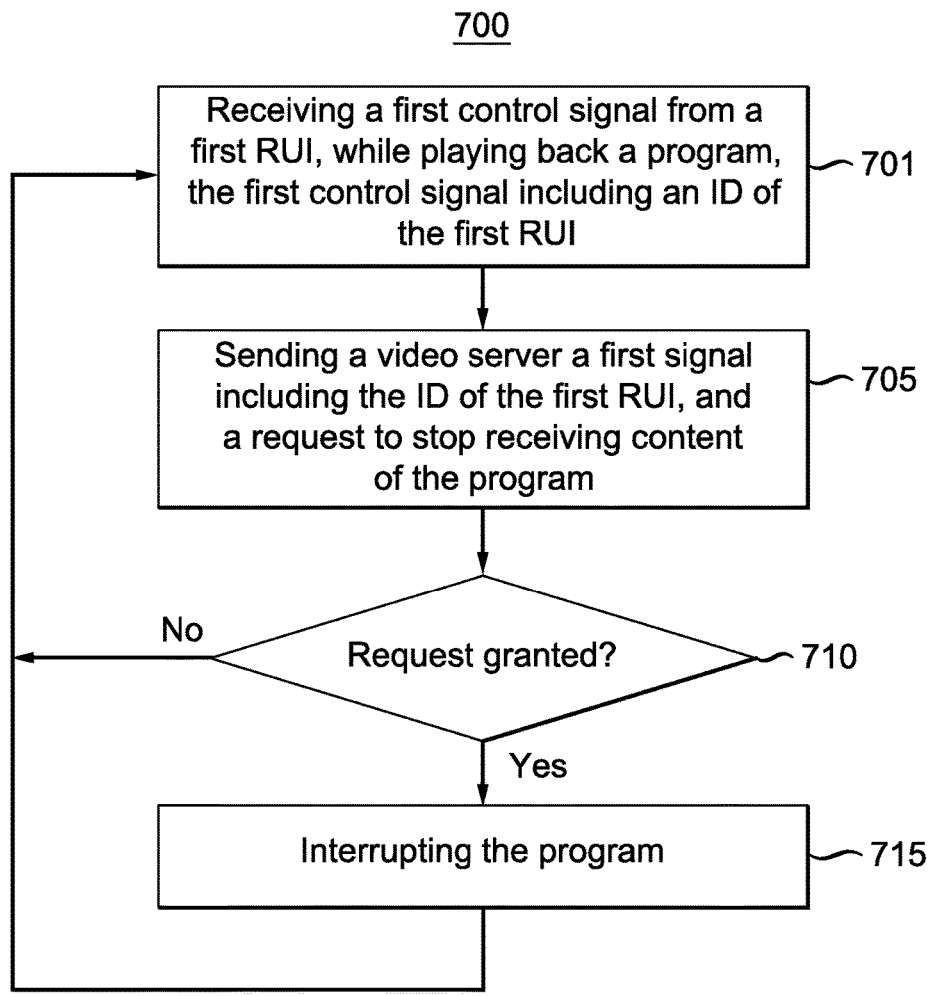
FIG. 7 shows the process flow of a video player in the system of FIG. 1, which initiates a follow-me session, according to an exemplary embodiment of the present invention.
Figure 8:
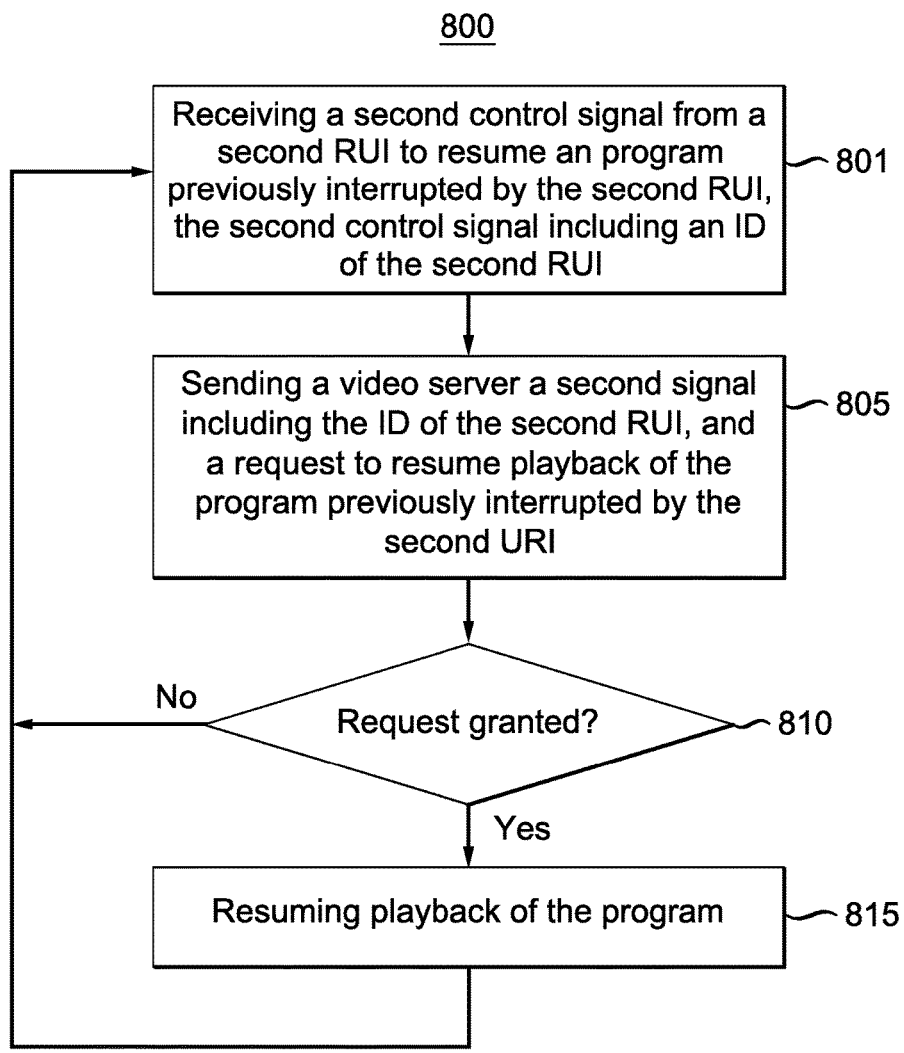
FIG. 8 shows the process flow of video player in the system of FIG. 1, which resumes playback of an interrupted program and ends a follow-me session, according to an exemplary embodiment of the present invention.

In the following, examples of the process flows of the system 1, the video server 10, and the participating video players 60 are provided to further illustrate the follow-me function according to the principles of the invention. FIG. 5 shows the process flow 900 of the system 1, FIG. 6 shows the process flow 600 of the video server 10, FIG. 7 shows the process flow 700 of a first one of the video players 60, which initiates the follow-me session if granted, and FIG. 8 shows the process flow 800 of the second one of the video players 60, which ends the follow-me session if granted. We illustrate these process flows with reference to FIGS. 1-4.

At the system level, the system server 10 may first receives a first control signal by a first one of the video players 60 from a first one of the RUIs 30 to interrupt a program currently played by the first one of the video players 60 at step 901. The first control signal includes an identification of the first one of the RUIs 30. The playback of the program is then interrupted at the first one of the video players 60 at step 905. The system 1 then stores the identification of the first one of the RUIs 30 and the status of the playback of the program at step 910.

If the program is a recorded program, the status indicates the position where the program is interrupted. For example, the status may indicate which byte, frame, or I frame if the program is MPEG encoded counting from the start of the program was last sent to the first one of the video players 60. If the program is a broadcast program, the status indicates the channel and, if necessary, the signal source from which the program is received, so that when the program is resumed, the system 1 knows how to tune that channel. It should be noted that the system may continue to receive and store signal from that channel from that channel after the interruption of the playback.

The system 1 then receives a second control signal by a second one of the video players 60 from a second one of the RUIs 30 to resume the playback of the program at step 915. The system 1 checks whether the stored identification of the first one of the RUIs 30 is identical to the RUI of the second one of the RUIs 30 at 920. If the two identifications are identical, the system 1 enables playback of the program by the second one of the video players 60 at step 925 according to the stored status. If the program is a recorded program, the system 1 sends the content of the program to the second one of the video players 60 from the position indicated in the status. If the program is a broadcast program, the system 1 tunes the channel indicated in the status and sends the content of the received signal to the second one of the video players 60. In another embodiment in which the video server 10 continues to receive and store signal in a buffer from that channel, the server 10 sends data in the buffer to the second one of the video players 60, so that the user does not lose any signal between the interruption and resumption of the broadcast signal from that channel.

If the two identifications are different, the system 1 continues to wait for the second control signal from any one of the video players 60.

In performing step 901, the first one of the video players 60 performs step 701 in FIG. 7 to receive the first control signal from the first one of the RUIs 30, while playing back the program. The content of the program may be buffered in the memory 505 of the first one of the video players 60. The first one of the video players 60 then sends a first signal including the identification of the first one of the RUIs 30 and a request to stop receiving content of the program to the video server 10 at step 705. The video server 10 receives the first signal and the request to stop the playback of the program by the first one of the video players 60.

In performing steps 905 and 910, the video server 10 stops sending content of the program to the first one of the video players 60, stores the identification of the first one of the RUIs 30, informs the first video player that the request is granted at step 605, and stores in the memory 305 the status of the playback of the program at step 610. Needless to say that the stored status and the stored identification of the first one of the RUIs 30 are linked, so that when the identification is found, the associated status can be found easily. In response, the first one of the video players 60 interrupts the playback of the program at step 715.

It should be noted that if a follow-me session is already initiated by the first one of the RUIs 30 and a second occurrence of the first control signal is received, the video server 10 should reject the request and in response, the first one of the video players 60 should not interrupt the playback of the program, as shown in FIG. 7.

In performing step 915, the second one of the video players 60 receives a second control signal from a second one of the RUIs 30 to resume a program previously interrupted by the second one of the RUIs 30 at step 801 in FIG. 8, and sends the video server 10 a second signal including the identification of the second one of the RUIs 30 and a request to resume the program at step 805. The video server 10 receives the second signal and the request from the second one of the video players 60 at step 615. The second one of the RUIs 30 can be any one of the RUIs 30 including the first one of the RUIs 30. In one embodiment, two RUIs may have the same ID and both RUIs should be viewed by the system as the same RUI.

In performing steps 920 and 925, the video server 10 checks if the stored identification is identical to the identification in the second signal at step 620. If the two identifications are the same, the video server 10 informs the second one of the video players 60 that the request has been granted and resumes sending content of the program to the second one of the video players at 625 in FIG. 6 according to the status stored in the memory 305. In response, the second one of the video players 60 resumes the playback of the program at step 815. The second one of the video players 60 resumes playback by receiving content of the program from the video server 10 and processing the content to produce output for display on the corresponding one of the displays 40. The received content of the program is buffered by the memory 505 in the second one of the video players 60.

If at step 620, the video server 10 determines that the two identifications are different, the video server 10 informs the second one of the video players 60 that the request is not granted at step 630 and continues to wait for a second control signal. In response, since in this embodiment, the OK signal is used for other functions as well, for example, selecting a menu item from a menu, the second one of the video players 60 may perform a different function other than resuming playback of a program or ignore the OK signal and does not resume playback of the program and continues to wait for the second control signal.

In the above example, it assumes that there is only one follow-me session in the system 1. However, each of the RUIs 30 may initiate a different follow-me session. If more than one of the RUIs 30 initiates follow-me sessions, multiple follow-me sessions exist and at steps 920 and 615, the video server 10 should check all the active follow-me sessions in the memory 105 and determine if the identification of the second one of the RUIs 30 is present in one of the follow-me sessions. If it is, the video server 10 grants the request and if not, denies the request. When a follow-me session has been completed, the identification of the corresponding RUI and the associated status information should be deleted from the memory 105.

In one embodiment, when the first one of the video players 60 requests to stop receiving content of the program is granted, i.e., requests to initiate a follow-me session, the first one of the video players 60 turns itself off. It is noted, that even though a video player is turned off, the processor 504, the portion of the network interface to the network 20 in the I/O 503, and IR/RF receiver 501 in the video player are still powered. The processor 504 can turn the video player back on upon a power-on control signal from one of the RUIs 30 or the video server 10. Although presented as an IR/RF receiver 503, a video player may include only an IR or RF receiver.

In another embodiment, once the request to initiate a follow-me session has been granted, the first one of the video players 60 also provides an indicator, for example, in the form of an OSD (not shown), an audio signal, such as beeps, or flash a LED, such as a power LED (not shown) attached to the corresponding digital media extender of the first one of the video players 60 indicating an follow-me session has been initiated from the first one of the video players 60.

In yet another embodiment, even though a follow-me session was initiated at the first one of the video players 60, a user can resume the same follow-me session at the first one of the video players 60.

In yet another embodiment, once the request to initiate a follow-me session has been granted, the first one of the video players 60 also sends an IR or RF or both to instruct the first one of the RUIs 30 to turn on one or more of the LEDs 308, so that a user is aware that the first one of the RUIs 30 has initiated a follow-me session and when a user uses the first one of the RUIs 30 to resume playback of the program at the second one of the video players 60 and if the resumption request is granted, the second one of the video players 60 sends an IR or RF or both signals to instruct the first one of the RUIs 30 to turn off the one or more of the LEDs 308 indicating that the follow-me session has been completed. The LED indication can also be replaced by audio signals such as beeps, or a message displayed on a display (not shown) attached to the participating RUI.

In yet another embodiment, the video server 10 when receiving the second signal also checks whether the second one of the video players 60 is capable of playing back the program before granting the request. It is noted that the video server 10 may store in the memory 105 capabilities of each of the video players 60 and available bandwidth of the cable network 20. For example, if the display 40 is not attached or the video server 10 is processing another follow-me session or has no resource, e.g., no bandwidth left in the cable network 20, to resume a playback, the video server 10 should reject the request. In this embodiment, if the resumption request has been denied, the second one of the video players 60 should provide audio/video indication indicating that the resumption cannot be performed. The second one of the video players 60 may send an RF signal or an IP message or both to instruct the second one of the RUIs 30 to do the same.

In another embodiment, after the resumption request is granted, the second one of the video players turns on itself. In yet another embodiment, when the second one of the video players receives the OK remote control signal, the second one of the video players turns itself on.

In one embodiment, if the first control signal is an RF signal and is received by both the first one and a third one of the video players 60, both send respective first signals to the video server 10 and the respective first signals include respective signal strength indicators for indicating the signal strength in receiving the first control signal. The video server 10 selects the one of the video players 60 having the signal strength indicator indicating a stronger signal strength as the one to interrupt the playback, i.e., to initiate a follow-me session. If more than two of the video players 60 receive the first control signal, the one with the strongest signal strength is selected. As such, in this embodiment, each video player should also measure the signal strength of the follow-me control signal from an RUI. If the signal strength from multiple RUI 30s is the same or not distinguishable, the video server 10 should send or instruct the corresponding video players 60 to send appropriate message to the corresponding RUIs 30 asking whether the RUIs 30 intend to stop playback at the corresponding video players 60.

In yet another embodiment, if the second control signal is an RF signal and is received by both the second one and a fourth one of the video players 60, both send respective second signals to the video server 10 and the respective second signals include respective signal strength indicators for indicating the signal strength in receiving the second control signal. The video server 10 selects the one of the video players 60 having the signal strength indicator indicating stronger signal strength as the one to resume the playback. If more than two of the video players receive the second control signal, the one with the strongest signal strength is selected. As such, in this embodiment, each video player should also measure the signal strength of the OK control signal from an RUI.

In yet another embodiment, if the system 1 includes a UPnP or a MoCA adapter (not shown) for connecting a router having Wi-Fi capability to the cable network 20 and the RUIs 30 are equipped with a Wi-Fi interface, most of the communication between an RUI and the video servers can be accomplished by sending/receiving IP messages, each of which specifies the source and destination addresses and each address is associated with one of the RUIs 30, the video players 60, and the video server 10. Under this embodiment, it is possible that an RUI sends all its requests to the video server 10 using the Wi-Fi network and receives control signals from either the video server 10 or the video players 60 through the Wi-Fi network as well.

In yet another embodiment, the system 1 may include more than one video server 10. In this embodiment, one video server or a separate controller may serve as a main controller to handle the follow-me functionalities and the status must also indicate which video server provided the program, so that the program can be correctly resumed by having the correct video server to resume sending the content of an interrupted program.

In another embodiment, a video server can also serve as a video player if a display can be attached to the video player and the RUIs 30 can control the video server in a similar manner as controlling a video player.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for use in a second video player, said method comprising steps of:

receiving a second control signal from a second remote control device to resume playback of a program previously interrupted by a first control signal transmitted by a first remote control device, said first control signal resulting from an activated follow-me key on the first remote control device, said follow-me key when activated initiating a follow-me session and indicating that a program being played will be interrupted and will be resumed by a same or a different video device, said second control signal comprising an identification of a second remote control device, said second control signal resulting from an activated resume key of the second remote control device, said resume key when activated indicating that the interrupted program is to be resumed; and sending a second signal to said video server, said second signal comprising said identification of said second remote control device and a request to resume playback of said program;

receiving from said video server a response;

if said response indicates to resume playback, resuming said playback of said program by receiving program signals from said video server; and if said response indicates not to resume playback, performing a different function assigned to said second control signal.

2. A first video player comprising:

a processor; and a memory; wherein said processor receives a second control signal from a second remote control device to resume playback of a program previously interrupted by a first control signal transmitted by a first remote control device, said second control signal comprising an identification of the second remote control device, said first control signal resulting from an activated follow-me key of the first remote control device, said follow-me key when activated initiating a follow-me session indicating that the program is to be interrupted and will be later resumed by the same or a different video player;

sends a second signal to said video server, said second signal comprising said identification of said second remote control device and a request to resume playback of said program, said second signal resulting from an activation of a resume key of the second remote control device which when activated indicates that the interrupted program is to be resumed;

receives from said video server a response;

if said response indicates to resume playback, receives content of said program from said video server, retrieves said received content buffered in said memory, and resumes said playback of said program in said memory, and if said response indicates not to resume playback, performs a different function assigned to the second control signal.

\* \* \* \* \*